(12) United States Patent
Magnuson

(10) Patent No.: US 12,594,981 B2
(45) Date of Patent: Apr. 7, 2026

(54) REMOVABLE SLED ASSEMBLY FOR PORTABLE SHELTER

(71) Applicant: Nate Magnuson, Houlton, WI (US)

(72) Inventor: Nate Magnuson, Houlton, WI (US)

( * ) Notice: Subject to any disclaimer, the term of this patent is extended or adjusted under 35 U.S.C. 154(b) by 354 days.

(21) Appl. No.: 18/530,843

(22) Filed: Dec. 6, 2023

(65) Prior Publication Data

US 2024/0190499 A1    Jun. 13, 2024

Related U.S. Application Data

(60) Provisional application No. 63/386,648, filed on Dec. 8, 2022.

(51) Int. Cl.
| | |
|---|---|
| *B62B 17/06* | (2006.01) |
| *A01K 97/01* | (2006.01) |
| *B62B 13/06* | (2006.01) |
| *B62B 13/16* | (2006.01) |

(52) U.S. Cl.
CPC .............. *B62B 17/06* (2013.01); *A01K 97/01* (2013.01); *B62B 13/06* (2013.01); *B62B 13/16* (2013.01)

(58) Field of Classification Search
CPC ......... B62B 17/06; B62B 13/06; B62B 13/16; A01K 97/01
See application file for complete search history.

(56) References Cited

U.S. PATENT DOCUMENTS

| | | | | |
|---|---|---|---|---|
| 1,904,120 | A | * | 4/1933 | Bommer .................... E05D 3/02 |
| | | | | 16/252 |
| 3,580,592 | A | * | 5/1971 | Schrecengost ......... A47C 17/64 |
| | | | | 280/8 |

| | | | | |
|---|---|---|---|---|
| D222,090 | S | | 9/1971 | Davis |
| 3,820,805 | A | | 6/1974 | Tuomala |
| 5,174,591 | A | | 12/1992 | Shappell |
| 5,341,588 | A | | 8/1994 | Lizotte |
| 5,653,456 | A | | 8/1997 | Mough |
| 5,918,890 | A | * | 7/1999 | Willems ................. B62D 63/06 |
| | | | | 280/18 |
| 6,626,441 | B1 | | 9/2003 | Hanson |
| 6,682,082 | B1 | | 1/2004 | Dalen |
| 7,581,735 | B2 | | 9/2009 | Birdsell et al. |

(Continued)

FOREIGN PATENT DOCUMENTS

| | | | | |
|---|---|---|---|---|
| AU | 2021240330 | A1 | | 12/2021 |
| CN | 105539562 | A | * | 5/2016 ........... B62B 15/007 |

(Continued)

OTHER PUBLICATIONS

CN-105539562-A English Translation (Year: 2016).*

(Continued)

*Primary Examiner* — Michael T. Walsh

(74) *Attorney, Agent, or Firm* — Weaver Legal and Consulting LLC

(57) ABSTRACT

Various systems are directed to a removable sled assembly for a portable shelter having a frame, the sled assembly generally including a runner and an attachment member that includes a support member extending upwardly from the upper surface of the runner, and a bracket configured to removably engage the frame of the portable shelter, wherein the bracket is coupled with the support member via a hinge that allows the bracket and runner to rotate relative to each other about a pivot axis.

20 Claims, 9 Drawing Sheets

(56) References Cited

U.S. PATENT DOCUMENTS

| | | | | |
|---|---|---|---|---|
| 7,726,667 | B2 | 6/2010 | Ferron | |
| 8,403,342 | B1 | 3/2013 | McDaniel | |
| 8,814,179 | B1 | 8/2014 | McCormick | |
| 8,857,825 | B1 | 10/2014 | Johnson | |
| 8,915,501 | B2* | 12/2014 | Forcier | B62B 13/18 |
| | | | | 280/11 |
| 9,139,216 | B1 | 9/2015 | Rivard et al. | |
| 9,174,663 | B2 | 11/2015 | Reinig | |
| 9,315,081 | B1* | 4/2016 | Beutler | B60D 1/06 |
| 9,487,225 | B1 | 11/2016 | Looman | |
| 9,717,976 | B2 | 8/2017 | Elphick | |
| 9,950,732 | B1 | 4/2018 | Patterson et al. | |
| 10,265,605 | B1* | 4/2019 | Mozlin | A63C 10/103 |
| 10,384,504 | B2* | 8/2019 | Nozzarella | B60P 3/38 |
| 11,097,763 | B1 | 8/2021 | Klassen | |
| D995,974 | S | 8/2023 | Ames | |
| 2008/0052873 | A1* | 3/2008 | Campbell | E05D 3/02 |
| | | | | 16/245 |
| 2015/0135561 | A1 | 5/2015 | Henning et al. | |
| 2017/0297394 | A1 | 10/2017 | Nozzarella | |
| 2020/0215416 | A1 | 7/2020 | May | |
| 2021/0198858 | A1 | 7/2021 | Henning et al. | |
| 2021/0276647 | A1 | 9/2021 | Nicoll et al. | |
| 2021/0387698 | A1 | 12/2021 | Kjellmann | |
| 2022/0119030 | A1 | 4/2022 | Maillard et al. | |
| 2024/0190499 | A1 | 6/2024 | Magnuson | |

FOREIGN PATENT DOCUMENTS

| | | | | |
|---|---|---|---|---|
| KR | 2471266 B1 * | 11/2022 | | |
| WO | WO-2023062258 A1 * | 4/2023 | | B62B 17/06 |

OTHER PUBLICATIONS

KR-2471266-B1 English Translation (Year: 2022).*
WO-2023062258-A1 English Translation (Year: 2023).*
Snow Tow Ski/ Model 2267, Snowtow Webpage[online], [Site Visit Jun. 19, 2025], URL: https://www.snowtow.co/products/snow-tow-ski-2267.
Wheel Skis For Single and Tandem Axle Fish Houses, Snowtow Webpage[online], [Site Visit Jun. 19, 2025], URL: https://www.snowtow.co/wheel-skis-fish-house.

* cited by examiner

REMOVABLE SLED ASSEMBLY FOR PORTABLE SHELTER

CROSS REFERENCE TO RELATED APPLICATIONS

This application claims benefit under 35 U.S.C. 119(e) to U.S. Provisional Patent Application Ser. No. 63/386,648, entitled "Removable Sled Assembly for Portable Shelter" and filed Dec. 8, 2022, the contents of which are incorporated herein in their entirety for all purposes.

FIELD

The present disclosure relates to a removable sled assembly that can be attached to a portable shelter, such as an ice fishing house. The assembly can include one or more removable sleds configured to be coupled with the frame of a portable shelter. The sled assembly can provide a contact surface to reduce or eliminate wear and tear on a portable shelter frame when the portable shelter is transported along uneven terrain, in particular along downhill slopes having snow and/or ice cover.

BACKGROUND

Ice fishing is a popular winter activity, particularly in northern climates. Ice fishing houses (ice houses) may be provided as a trailer unit and can include two to four wheels to allow them to be pulled by a motorized vehicle to various locations on a body of water (such as a lake or river) or over land. Recently, ice houses have become increasingly larger in size and weight, for example, ice house trailers can have lengths of 21 feet and can have a gross weight of over 5,700 pounds. Many ice house trailers can have low clearance from the terrain, for example, 2 feet or less.

The weight and dimensions of ice houses can make them challenging to transport to a selected ice fishing location. For example, participants in ice fishing are confronted with the challenge of transporting their ice house to a selected location upon a frozen body of water. In this regard, the user must frequently transport his or her ice house down slopes (such as boat landings) toward the body of water. When the ice house is transported down slopes, the rear portion of the ice house frame can become damaged as it contacts the terrain of the slope.

BRIEF SUMMARY

The present disclosure is directed to a removable sled assembly for attachment to the frame of a portable shelter. In some implementations, the removable sled assembly can be attached to the frame of an ice house.

In some implementations, there is provided a removable sled assembly for a portable shelter having a frame, the sled assembly comprising:

a runner having an upper surface, a front portion, a rear portion, a main body, a longitudinal axis, and a width; and an attachment member comprising a support member extending upwardly from the upper surface of the runner, a bracket configured to removably engage the frame of the portable shelter, wherein the bracket is coupled with the support member via a hinge that defines a pivot axis and allows the bracket to rotate relative to the runner about the pivot axis.

In some aspects, the bracket has a longitudinal axis that is perpendicular to the longitudinal axis of the runner. In some implementations, the bracket further can optionally comprise a fastener. In some implementations, one or more interior faces of the bracket can include surface treatment (such as one or more pads, cushions, or strips of non-slip, cushioned material). In various implementations, the bracket may be adjustable to form a secure fit at the area of attachment to the frame of the portable shelter. In some implementations, the bracket comprises vertical sides, and at least one of the vertical sides is movable to adjustably fit around the frame of the portable shelter.

In some implementations, the hinge comprises a loose-pin hinge. The loose-pin hinge may comprise a hinge barrel and a removable pin having a terminal bent portion and/or a hole for engaging a fastener, such as a cotter pin or the like.

In various implementations, the front portion of the runner extends from the main body at an upward angle with respect to horizontal to provide a front portion height. Optionally, the front portion of the runner is tapered. In some implementations, the rear portion of the runner extends from the main body at an upward angle with respect to horizontal to provide a rear portion height. In some aspects, the rear portion height can be less than the front portion height.

In accordance with some implementations, the attachment member of the removable sled assembly may comprise two or more support members. In some implementations, the attachment member may further comprise gussets attached to the support members. The gussets may be positioned at an interior space between the support members.

In various aspects, sled assemblies described herein are configured for removable attachment to the frame of a portable shelter. Thus, it can be beneficial to fabricate the sled assemblies of one or more materials that can provide such features as light weight, resistance to corrosion, and durability. In some implementations, sled assemblies may be constructed of aluminum.

BRIEF DESCRIPTION OF THE DRAWINGS

The disclosure may be more completely understood in consideration of the accompanying drawings, in which.

The figures are not necessarily to scale. Like numbers in the figures refer to like components. However, it will be understood that the use of a number to refer to a component in a given figure is not intended to limit the component in another figure labeled with the same number.

DETAILED DESCRIPTION

Figure 1:
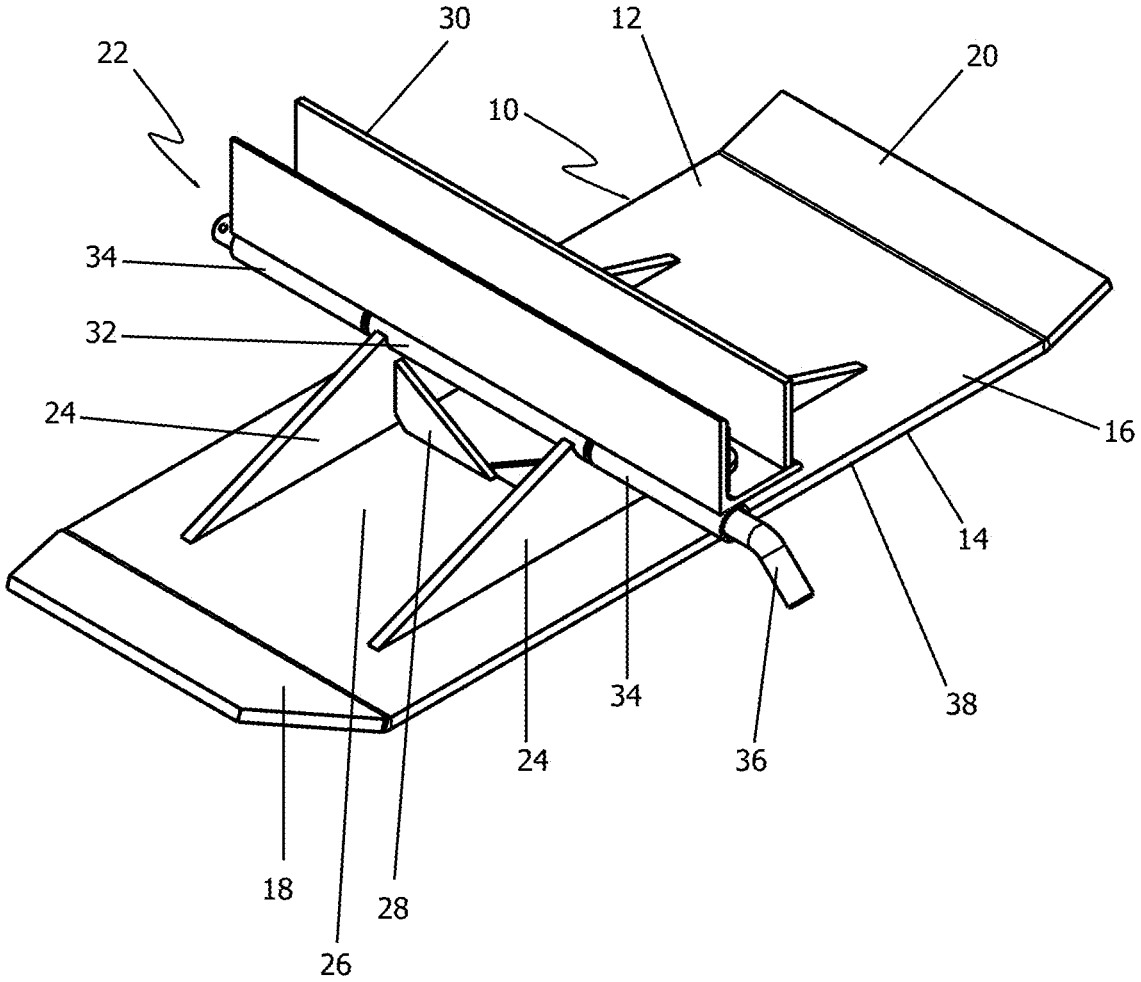
FIG. 1 is a perspective view of a removable sled assembly in accordance with some implementations.

In the following description, reference is made to the accompanying set of drawings that form a part hereof and in which are shown by way of illustration several specific implementations. It is to be understood that other implementations are contemplated and may be made without departing from the scope or spirit of the present disclosure. The following detailed description, therefore, is not to be taken in a limiting sense.

In the following description, for purposes of explanation, numerous specific details are set forth in order to provide a thorough understanding of the present disclosure. It will be evident, however, to one skilled in the art that the present disclosure may be practiced without these specific details. The present disclosure is to be considered as an exemplification and is not intended to limit the disclosure to the specific implementations illustrated by the figures or description below.

Various embodiments of assemblies described herein may have components described by locational terms such as "up," "upwardly," "down," "downwardly," "vertically," "laterally," "horizontally," "around," "front," "back," "top," "upper," "bottom," "lower," and the like. These terms refer to the assembly as it is oriented and appears in the drawings and are used for convenience only; they are not intended to be limited or to imply that the assembly must be used or positioned in any particular manner.

In a general sense, some concepts may provide a removable sled assembly configured for attachment to the frame of a portable shelter. As used throughout this disclosure, the term "portable shelter" should be given broad meaning, including such structural shelters as ice fishing houses, hunting structures, and the like. Further, the use of the term "shelter" is not limited to structures configured to contain people, but is rather intended in its broadest sense to include any nonautomotive vehicle (e.g., a vehicle that does not have the capacity to advance on its own) designed to be hauled by another vehicle, such as a trailer to be hauled by a powered vehicle. Generally, a portable shelter includes a structural frame, for example, a metal frame. In some aspects, a portable shelter may be an ice fishing house trailer unit.

In some implementations, a removable sled assembly is described that is configured for attachment to a frame of a portable shelter along the shelter's trailing edge. As used herein, the "trailing edge" of a portable shelter frame refers to the frame edge that is the rearmost edge of the portable shelter when the shelter is moving. The trailing edge is thus opposite the leading edge of the portable shelter.

In some implementations, a removable sled assembly can be constructed of various materials such as, but not limited to, metals such as aluminum. In some aspects, the material can be selected to provide such desired features as durability, corrosion resistance, and suitable weight to allow the removable sled assembly to be easily moved, attached, and detached from a portable shelter frame. Removable sled assemblies described herein can provide an easy to use, durable device to reduce wear and tear on portable shelter frames during transport, and particularly when the portable shelter is being transported over rough or uneven terrain (such as downward slopes that lead to ice fishing locations on frozen bodies of water).

In some aspects, a sled assembly can be relatively lightweight, for example, about 10 pounds to about 20 pounds, or about 15 pounds to about 17 pounds, or about 16 pounds. This may provide a convenient, portable, easy to use device to protect the frame of a portable shelter. When not in use, the sled assembly can be easily removed and stowed.

In some aspects, a pair of sled assemblies can be used in connection with a portable shelter. In these aspects, each sled assembly can be attached to the frame of a portable shelter at a desired location, i.e., positioned adjacent each other or spaced apart. In some implementations, a single sled assembly, or more than two sled assemblies can be utilized with a portable shelter. The number of sled assemblies used in connection with a portable shelter can be selected to provide desired protection of a frame of the shelter to which it is attached. For example, for larger portable shelters, two or more sled assemblies may be useful, while one sled assembly may be sufficient for smaller portable shelters. In addition, the dimensions of the sled assembly can affect how many are used in connection with a portable shelter.

The present disclosure will now be described by example and through referencing the appended figures representing various implementations. FIGS. 1-9 illustrate an example of a sled assembly that is configured to be removably coupled to the frame of a portable shelter. Turning to FIG. 1, in general aspects, a perspective top view of a removable sled assembly is shown, which includes a runner 10 and an attachment member 22. Runner 10 may have an upper surface 12, a lower surface 14, main body 16, front portion 18, rear portion 20, and lateral edges 38. In some implementations, attachment member 22 is associated with the upper surface 12 of the runner 10. In various aspects, the attachment member 22 can be associated with the main body 16 of the runner 10. Attachment member 22 is configured to releasably secure the runner 10 to a frame of a portable shelter.

As illustrated in FIG. 1, runner 10 may include a main body 16 comprised of an elongated planar structure as illustrated in FIGS. 1-9. Dimensions of the runner 10 may vary depending upon such factors as the size and weight of the portable shelter with which the sled assembly will be used, the anticipated surface conditions of use, and the like. For example, in some implementations, runner 10 may have a length 82 in a range of about 25 inches to about 35 inches, or about 30 inches to about 32 inches. In some aspects, runner 10 may have a width 74 in a range of about 10 inches to about 15 inches, or about 11 inches to about 13 inches. In some aspects, runner 10 may have a length 82 that is greater than its width 74. In some implementations, runner 10 is constructed of a single sheet of material (such as aluminum), having a suitable thickness.

In some implementations, front portion 18 extends from main body 16 at an upward angle with respect to horizontal. In various implementations, the upward angle of front portion 18 can be selected to contour the initial contact surface of the runner 10 during use. In this manner, first portion 18 may travel along an uneven terrain without digging into the ground and thus creating resistance to movement of the portable shelter. Upward angle of front portion 18 can be selected based upon such factors as overall dimensions of the runner, anticipated conditions of use (e.g., snow, ice, sand, rocks, and the like), anticipated terrain, and the like.

In various implementations, rear portion 20 extends from main body 16 at an upward angle with respect to horizontal. In various implementations, the upward angle of rear portion 20 can be the same or different from the upward angle of front portion 18. In some aspects, the upward angle of rear portion 20 can be selected to contour the rear contact surface of the runner 10 during use.

In some implementations, attachment member 22 extends upwardly from the upper surface 12 of the main body 16 of the runner 10 as illustrated in FIG. 1. The attachment member 22 may be fabricated of any suitable material, such as aluminum.

In various implementations, attachment member 22 may include support members 24 and bracket 30, wherein the support members 24 and bracket 30 are coupled together via a hinge. In some aspects, the support members 24 extend upwardly in a vertical manner and may be attached to the runner via welding or other suitable fastening devices (such as bolts). The support members 24 can be provided with dimensions suitable to provide sufficient strength to support the bracket 30. In some implementations, the support members 24 can be provided with a height 58 that provides desirable clearance between the upper surface 12 of the runner 10, and the bracket 30. Illustrative factors that may impact the clearance between the runner and the bracket can include, for example, the desired amount of rotation of the runner 10 and bracket 30 relative to each other, features of the terrain to be traversed, anticipated depth of ice or snow to be encountered during use, and the like. In some aspects, support members 24 can be provided with a height 58 in a range of about 3 inches to about 5 inches, or about 3.5 inches to about 4.5 inches, for example.

As illustrated in FIG. 1, in various embodiments, support members 24 can be provided in a spaced, parallel configuration on the main body 16 of runner 10, thus defining an interior area 26. Support members 24 can be provided any desirable distance apart. It will be understood that any number of support members 24 may be used in connection with sled assemblies described herein. For example, a single, solid support member 24 may be used, or more than two support members 24 may be used.

In some implementations, attachment member 22 may further include one or more gussets 28. In some aspects, gusset 28 may be attached to the runner and/or support member via fastening devices (such as bolts) or welding. In some implementations, gusset 28 can be provided within the interior space 26, as shown in FIG. 1. One or more gussets 28 can be utilized, as desired. In some implementations, gusset 28 can be provided outside interior space 26, for example between support member 24 and lateral edge 38 of runner 10.

In some aspects, attachment member 22 may further include bracket 30. In various implementations, bracket 30 can comprise a U-shaped bracket. Bracket 30 can be fabricated as a single part, or can comprise separate parts that are fixed together, e.g., by welding. Generally speaking, bracket 30 can be sized to fit onto the frame of a portable shelter, such as an ice house.

In some implementations, support members 24 and bracket 30 can be coupled together via a hinge 40. Suitable hinges can comprise any hinge that allows rotation of the bracket 30 relative to the support members 24. One illustrative hinge, a loose-pin hinge, is depicted in FIG. 1. In these aspects, attachment member 22 includes support knuckle 32. Support knuckle 32 can be positioned at or near the apex of the support member 24. Support knuckle 32 may be provided as a hollow tube that may be solid along its length or include apertures or slits along its length. One implementation shown in FIG. 1 illustrates support knuckle 32 that extends between support members 24.

In some implementations, bracket 30 may include bracket knuckles 34. Bracket knuckles 34 may be provided as a hollow tube that may be solid along their length or include apertures or slits along their length. Bracket knuckles 34 may be attached to the bottom surface of bracket 30.

As illustrated in FIG. 1, bracket knuckles 34 and support knuckle 32 can be brought into alignment to create hinge barrel, which forms a passage for removable pin 36. In this manner, once removable pin 36 is inserted into the hinge barrel, bracket 30 and support members 24 form a hinge 40 or mechanical bearing that allows a limited angle of rotation between the bracket 30 and remainder of the sled assembly. In some implementations, the mounted removable sled assembly may pivot about a pivot axis 42 that extends through the removable pin 36 connecting the bracket 30 and support members 24. In some implementations, the removable sled assembly may pivot only about a pivot axis 42 that extends through the removable pin 36, and not about any other axis. In various aspects, hinge 40 may comprise a unidirectional hinge (e.g., a one-way hinge that only permits pivot along one axis).

Figure 2:
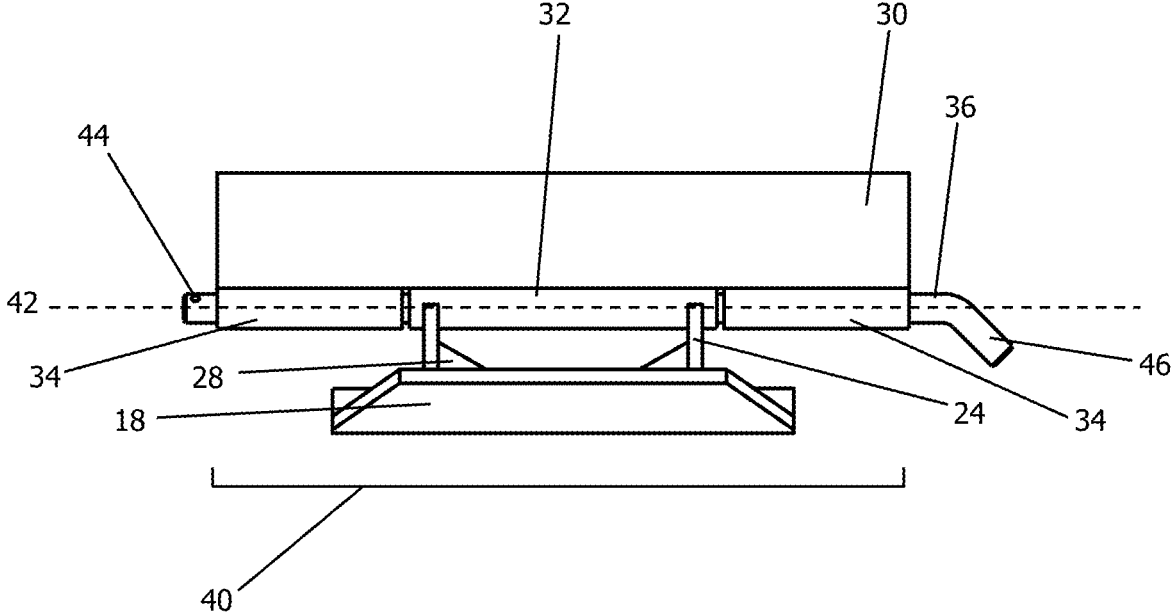
FIG. 2 is a perspective view from the front end of a removable sled assembly in accordance with some implementations.

FIG. 2 shows a perspective view from the front end of a removable sled assembly in various implementations. As illustrated, front portion 18 of the runner can be provided with an upward angle relative to the horizontal position of the main body 16. Support knuckle 32 is aligned with bracket knuckles 34 to form hinge barrel. Pin 36 is inserted through hinge barrel to secure the bracket 30 to the remainder of the attachment member 22 (and thus also to the runner 10), thereby forming hinge 40. In some implementations, pin 36 is retained within the hinge barrel but is also removable when desired. In FIG. 2, pin 36 is illustrated as a bent pin, having a terminal bent portion 46. At its opposite end, pin 36 includes a hole 44 that is configured to receive a fastener, such as a cotter pin. In some implementations, a fastener such as an R-clip can be used. The fastener can be made of the same, or different, material from the remained of the removable sled assembly.

In some implementations, insertion of pin 36 into the hinge barrel allows the bracket 30 and support members 24 to form a hinge 40 or mechanical bearing that allows the mounted removable sled assembly to pivot about pivot axis 42 that extends through the pin 36.

It will be appreciated that providing terminal bent portion 36 may assist in retention and removal of pin 36 from the hinge barrel; however, other configurations for achieving these ends (such as splined pins) can also be utilized in accordance with concepts described herein.

Figure 3:
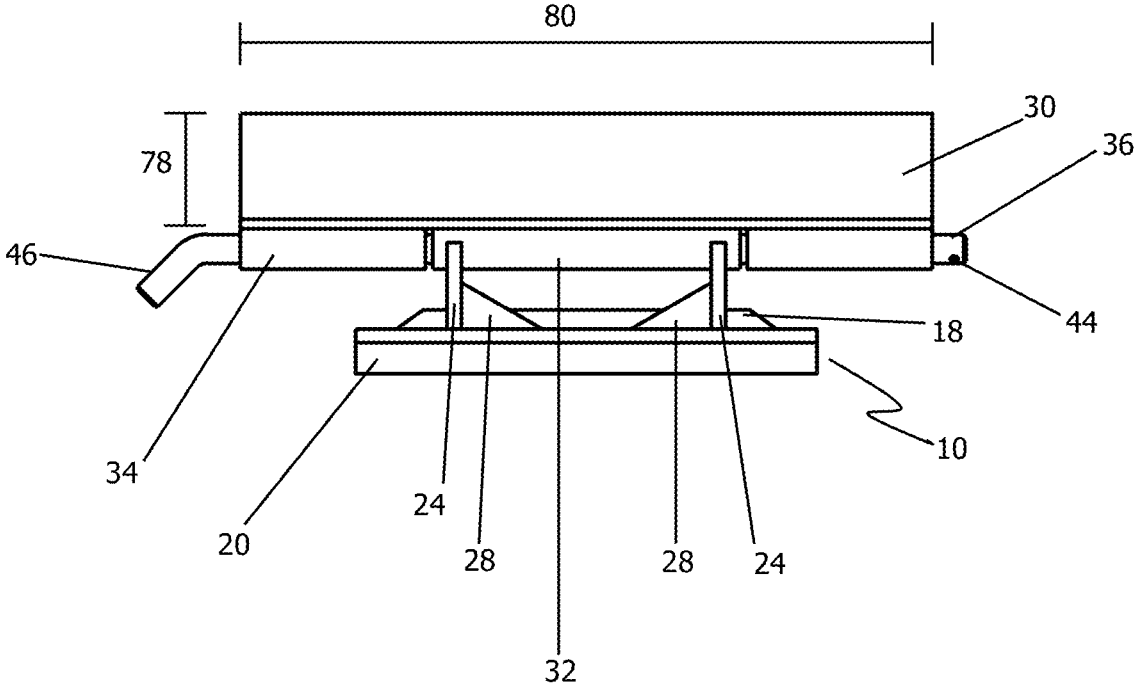
FIG. 3 is a perspective view from the back end of a removable sled assembly in accordance with some implementations.

FIG. 3 illustrates a perspective view from the back end of a removable sled assembly, including rear portion 20 that is provided with an upward angle. In some implementations, support members 24 can be attached to gussets 28 and include support knuckle 32 at their apices. Bracket 30 may include bracket knuckles 34. As shown in FIG. 3, bracket knuckles 34 are aligned with support knuckle 32 to form hinge barrel, and removable pin 36 is inserted into the hinge barrel to pivotally connect the support bracket 30 with the support members 24 via hinge 40.

Figure 6:
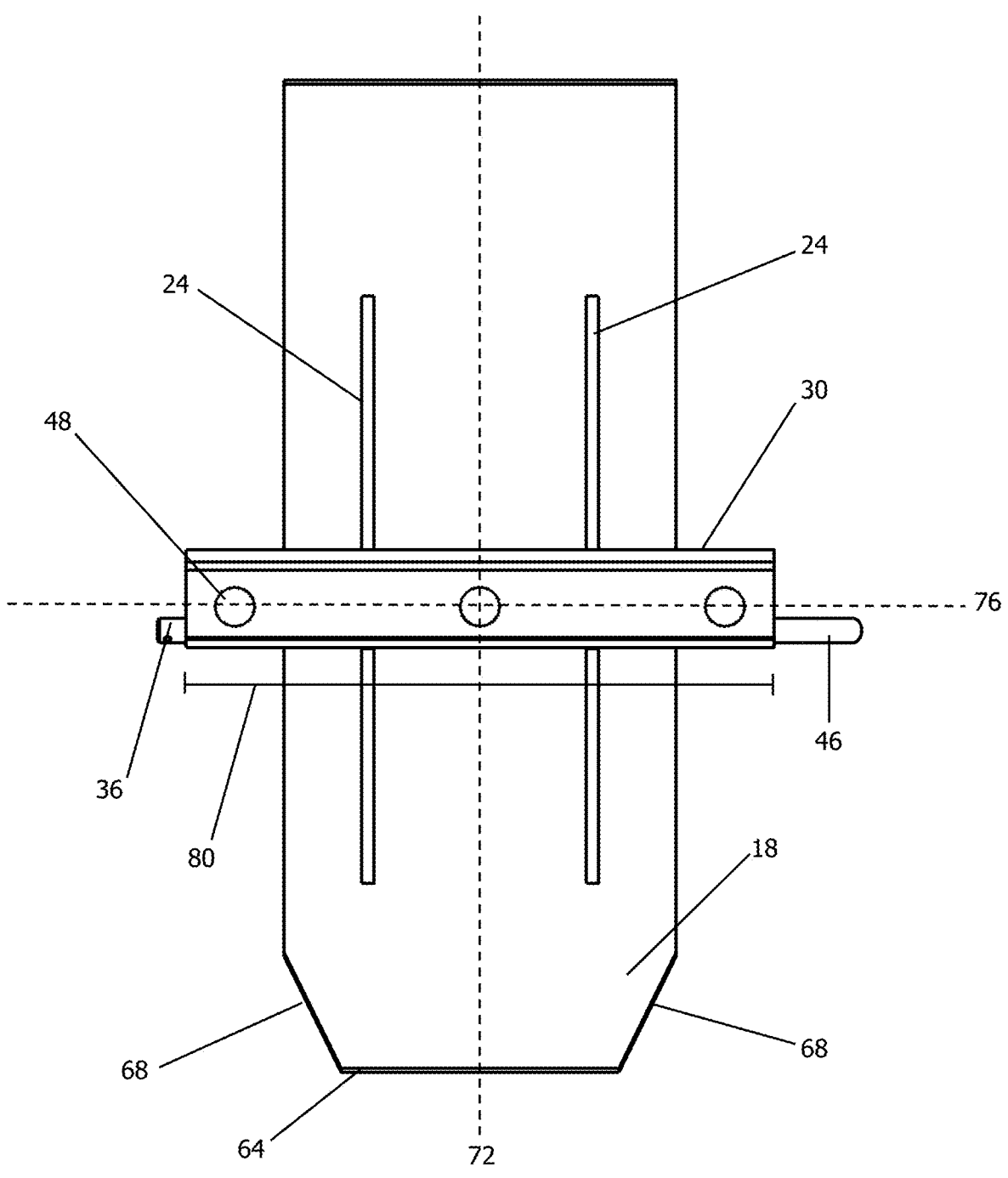
FIG. 6 is a perspective top view of a removable sled assembly in accordance with some implementations.
Figure 7:
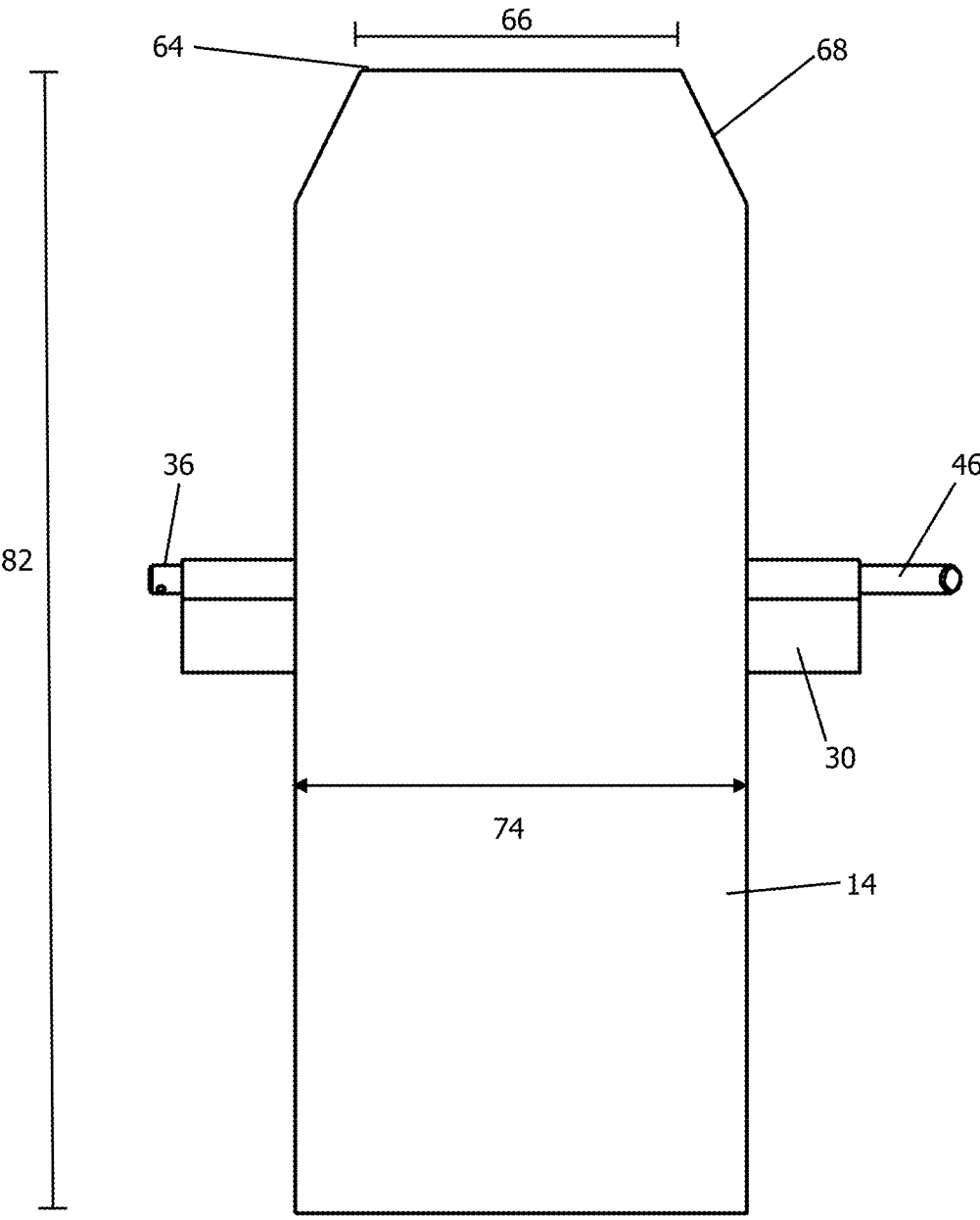
FIG. 7 is a perspective bottom view of a removable sled assembly in accordance with some implementations.

In various implementations, bracket 30 can be provided with suitable dimensions to engage the frame of a portable shelter. These features will now be described with reference to FIGS. 3, 5, 6, and 7. As shown, bracket 30 can be provided with a length 80 that is greater than the width 74 of the runner 10. In these aspects, portions of the bracket 30 can extend beyond the lateral edges 38 of the runner, as shown in FIGS. 6 and 7, for example. The length of extension beyond the lateral edges 38 of the runner can be selected for a particular application. In various implementations, bracket length 80 can be in a range of about 15 inches to about 20 inches, or about 16 inches to about 19 inches. In some implementations (not shown), bracket 30 can be provided with a length 80 that is the same or even less than the width 74 of the runner 10.

Generally, bracket 30 can comprise vertical sides 31, base 33, a height 78, and interior width 70. In various aspects, these dimensions can be selected to provide suitable engagement of the bracket 30 with the frame of a portable shelter. In some embodiments, bracket 30 can have a height 78 in a range of about 3 inches to about 4 inches, and an interior width 70 in a range of about 2 inches to about 3 inches. In some implementations, bracket 30 can be provided with an adjustable width, for example, by configuring the bracket to allow at least one vertical side 31 of the bracket 30 to move and thereby adjust the interior width 70. In these aspects, the width 70 of bracket 30 can be adjusted to engage the frame of a portable shelter in a stable manner such that the sled assembly is securely coupled to the frame of the portable shelter during use. In use, the removable sled assembly can be brought into contact with a portable shelter by slipping the bracket 30 around the frame of the portable shelter. In these aspects, initial width 70 of the bracket can be slightly greater than the width of the portable shelter frame. Once in place, the bracket 30 can be adjusted to reduce the width 70 by moving at least one vertical side 31 of the bracket 30 along the base 33 (e.g., by sliding, ratcheting, or clamping) until the vertical side is engaged with the frame in a manner that will remain in place during use and maintain a neutral position of the clamp 30 relative to the portable shelter frame. In these aspects, the bracket comprises vertical sides, and at least one of the vertical sides is movable to adjustably fit around the frame of the portable shelter.

Figure 4:
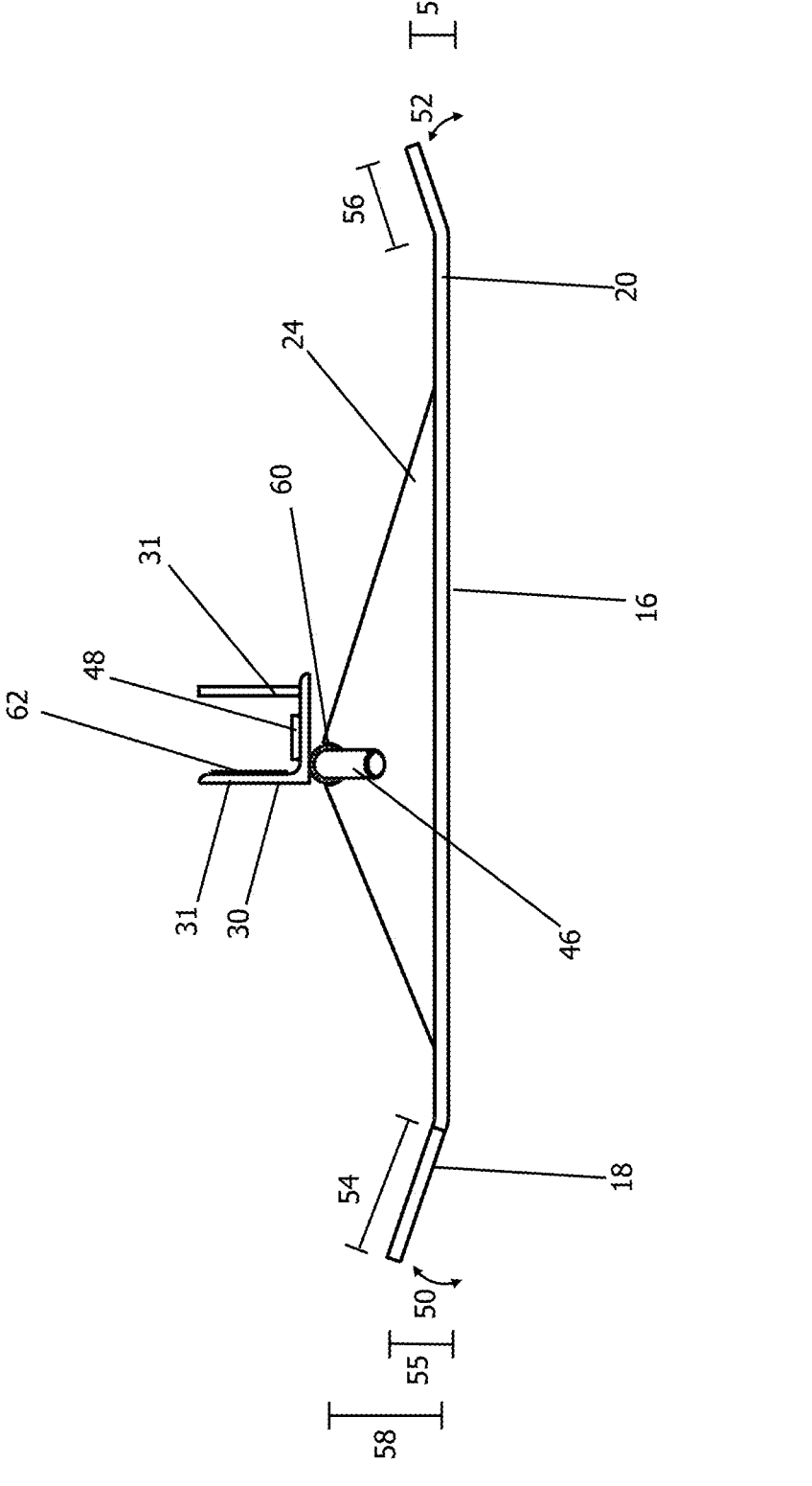
FIG. 4 is a perspective side view of a removable sled assembly in accordance with some implementations.
Figure 5:
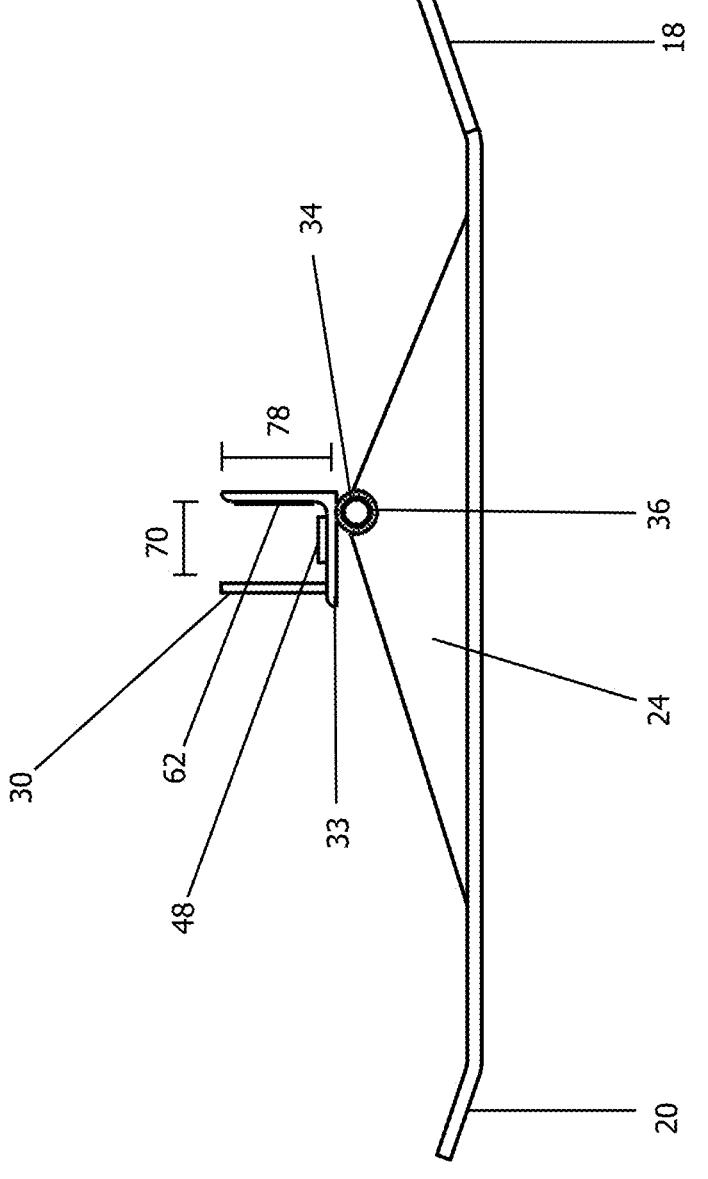
FIG. 5 is a perspective side view of a removable sled assembly in accordance with some implementations.

FIGS. 4 and 5 are perspective side views of a removable sled assembly in accordance with various implementations. From this view, various features relating to height of components can be more clearly observed. As discussed herein, front portion 18 may extend upwardly at an angle (shown at 50) from the main body 16, to provide a front portion height 55. Likewise, rear portion 20 may extend upwardly at an angle (shown at 52) from the main body 16, to provide a rear portion height 57. Angle 50 may be equal to or greater than angle 52. In some implementations, front portion 18 may have a length 54 and rear portion 20 may have a length 56. Length 54 may be equal to or greater than length 56. Front portion height 55 may be equal to or greater than rear portion height 57. In various implementations, support member 24 has a height 58, which can be measured from the upper surface 12 of the main body 16, to the apex of support member 24.

In some implementations, support member 24 can include a cutout 60 that is sized and configured to receive the support knuckle 32. In accordance with these aspects, the support knuckle can be recessed, or seated, within the apex of the support member 24. Support knuckle 32 can be secured to the support member 24 in any suitable manner, such as by welding.

In various implementations, support bracket 30 may optionally include one or more fasteners 48. In some embodiments, fastener 48 can be a magnet. When utilized, fastener(s) can provide additional securement of bracket 30 to the frame of a portable shelter. For example, when fastener 48 comprises a magnet, the magnet can provide additional attraction and securement of the bracket 30 to a metal frame of a portable shelter, such as an ice house. In some implementations, bracket 30 may include a surface treatment 62 on one or more interior faces that come into contact with a frame of a portable shelter in use (e.g., one or more vertical sides 31 and/or base 33). As illustrated in FIG. 5, surface treatment may comprise a pad, cushion, strip, or other material that is attached to an interior face of bracket 30. In these aspects, the material used for the surface treatment can comprise a polymer that provides one or more beneficial features, such as anti-slip, gripping, cushioning, or the like. Illustrative polymers include, for example, rubber (styrene butadiene rubber, natural rubber, EPDM rubber, butyl rubber), polyurethane, neoprene, blended foams, EVA foams, and the like. In some implementations, one ore more surface treatments 62 can provide a non-abrasive contact with the frame of a portable shelter. This can be beneficial in minimizing damage to a portable shelter frame, as such damage could promote rust or other deterioration of the frame.

As illustrated in FIG. 5, bracket 30 can be provided with an interior width 70 that is sized to receive a frame of a portable shelter. In some implementations, bracket 30 may be fabricated from a single piece of material (e.g., metal) that is bent to provide a U-shape. In some implementations, bracket 30 may be fabricated from multiple pieces of material (e.g., metal) that are subsequently joined or connected to form a U-shape. In various implementations, bracket 30 may be fabricated from more than one piece of material (e.g., one or more of the vertical sides 31 and/or base 33 can be provided as separate pieces) such that the interior width 70 may be adjusted to securely receive and retain the frame of a portable shelter, as discussed herein.

FIG. 6 is a perspective top view of a removable sled assembly in accordance with various implementations. As illustrated, front portion 18 of runner 10 can be provided with a tapered shape (shown at 68). FIG. 6 also illustrates embodiments wherein multiple fasteners 48 are included within bracket 30. As illustrated in FIG. 6, bracket 30 has a longitudinal axis 76 that is perpendicular to the longitudinal axis 72 of runner 10. In this manner, bracket 30 can engage the frame of a portable shelter in a way that allows the sled assembly to elevate the frame above terrain during transport, and pivot about a pivot axis to reduce wear and tear on the frame.

FIG. 7 is a perspective bottom view of a removable sled assembly in accordance with various implementations. In some aspects, the front edge width 66 of runner 10 is less than the width 74 of the runner main body 16. Lower surface 14 of the runner 10 may be substantially planar and smooth. In some aspects, runner 10 comprises a solid piece that does not include cut-out portions.

Figure 8:
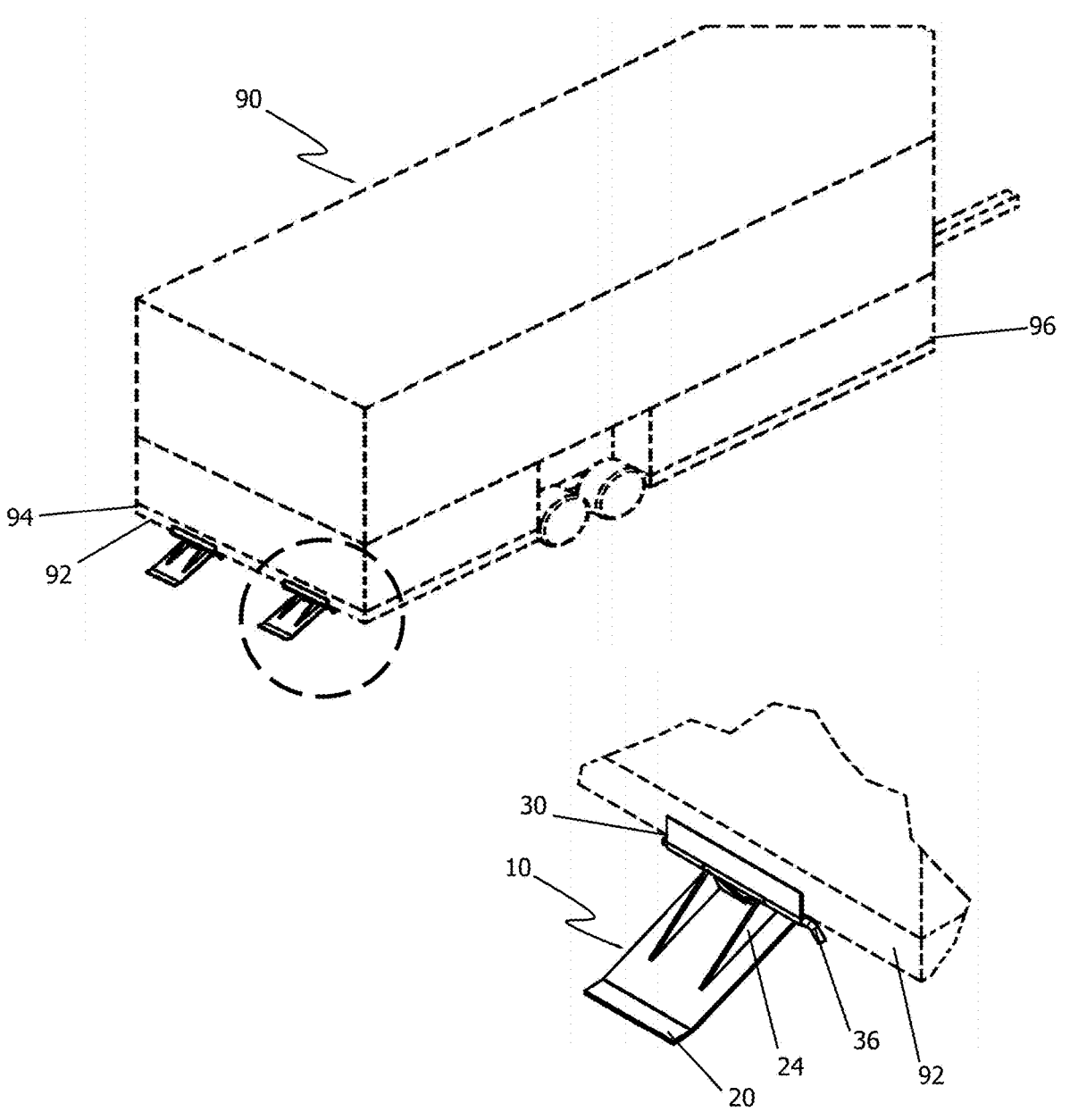
FIG. 8 is a perspective view of a removable sled assembly used in connection with a portable shelter in accordance with some implementations.

FIG. 8 is a rear perspective view of a removable sled assembly used in connection with a portable shelter in accordance with some implementations. As shown, a pair of removable sled assemblies are attached to the frame 92 at the trailing edge 94 of a portable shelter 90. Each sled assembly can be positioned on frame 92 along the trailing edge 94 at a desirable location. When in place, the front portion 18 of the runner is located beneath the portable shelter 90 and is not visible in the figures. As illustrated in the partial detail of FIG. 8, runner 10 can be rotated about an axis that is perpendicular to its longitudinal axis. In this manner, the removable sled assemblies can contact terrain while the portable shelter is in transport, and may reduce wear and tear on the portable shelter frame 92.

Figure 9:
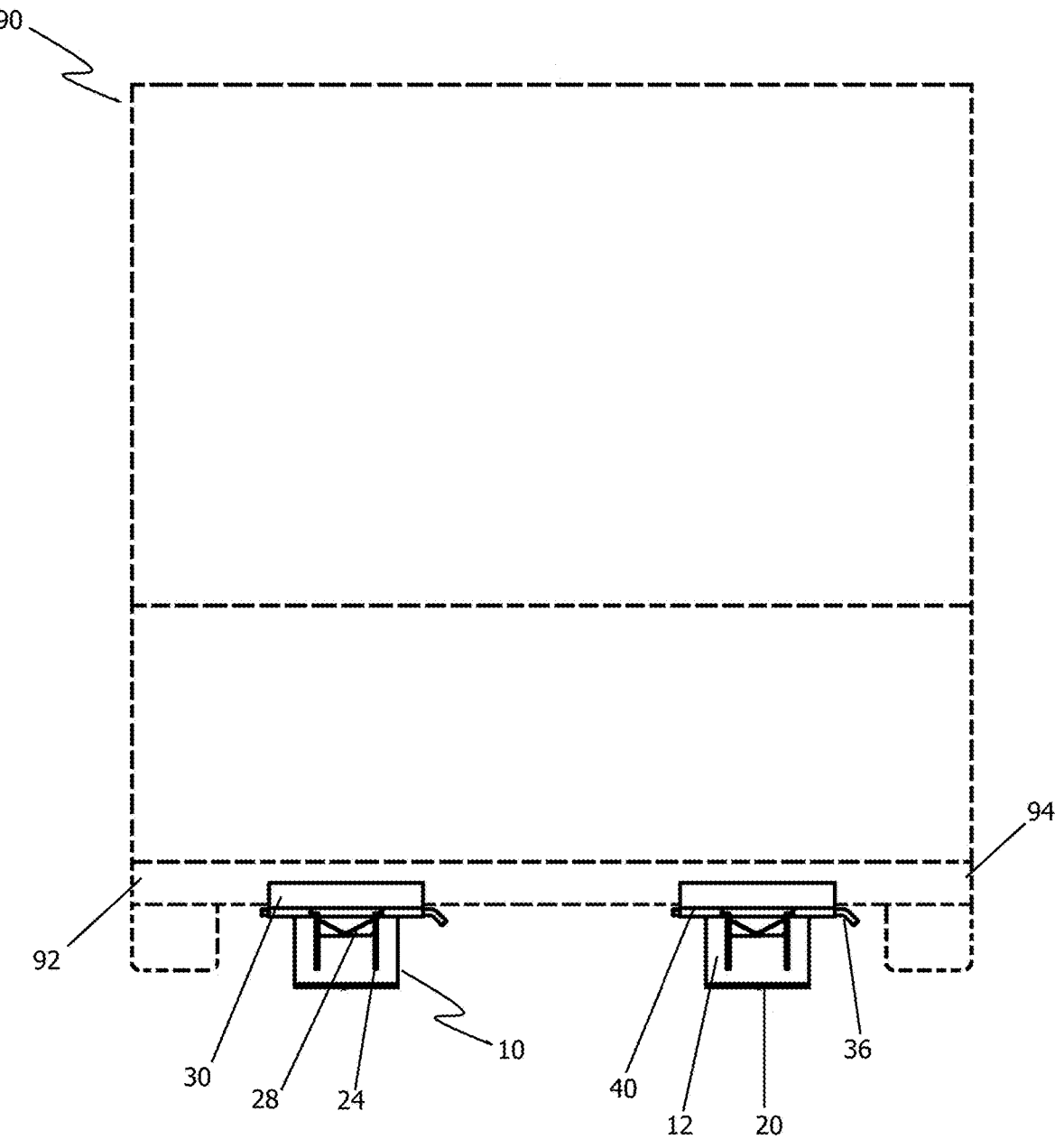
FIG. 9 is a perspective view of a removable sled assembly used in connection with a portable shelter, from the back end in accordance with some implementations.

FIG. 9 is a rear view of a removable sled assembly used in connection with a portable shelter in accordance with some implementations. As illustrated, a pair of removable sled assemblies are attached to the frame 92 of a portable shelter 90 along the shelter's trailing edge 94. Bracket 30 engages frame 92 in a manner to securely attach the sled assembly to the portable shelter during use. Bracket 30 and runner 10 are rotatable about a pivot axis defined by the hinge 40.

In various implementations, a removable sled assembly as described herein may be used in a manner that reduces wear and tear on the frame of a portable shelter. Illustrative portable shelters include ice fishing houses, hunting shelters, trailers, and the like. In some implementations, removable sled assemblies may find particular application when a portable shelter is transported across uneven terrain and/or in ice or snow.

In various implementations, the sled assembly is removable by providing a quick-release bracket that can be easily attached to the frame of a portable shelter by fitting a bracket to the frame along the frame's trailing edge. Attachment to the frame may be enhanced by one or more fasteners positioned in the interior of the bracket. In some implementations, attachment to the frame may be enhanced by one or more surface treatments on the interior of the bracket. In some aspects, the "quick-release" nature of the removable sled assembly relates to the ability to attach and remove the assembly to the frame of a portable shelter without use of bolts, screws, or other securements that require manipulation and/or additional tools. The sled assembly can be easily placed on the trailing frame of a portable structure when the structure will be transported across uneven terrain, and then easily removed once the portable structure has passed over the terrain.

In some implementations, to remove the sled assembly, the user can decouple the bracket 30 from the portable shelter frame. Decoupling can be accomplished by loosening the grip of bracket 30 from the portable shelter frame, for example, by moving (e.g., by sliding, ratcheting, or other like mechanism) one or more vertical sides 31 of the bracket 30 to increase the interior width 70 of the bracket. Once the bracket 30 is decoupled, the sled assembly can be removed from the portable shelter and stored until future use. In some aspects, the sled assembly can be removed as a one-piece unit (i.e., including the runner and attachment member). In some aspects, the sled assembly can be removed in two pieces, for example, if a user desires to first remove the hinge pin, thereby separating the bracket from the remaining portions of the sled assembly (e.g., runner and support member). Likewise, sled assemblies described herein can be stored as one-piece units, or the sled assembly can be separated into multiple pieces for storage by removing the hinge pin and separating the bracket from remaining portions of the sled assembly. Sled assemblies described herein thus provide flexibility for use (mounting and decoupling) and storage.

In various implementations, the sled assembly is provided along the trailing edge of a portable shelter frame. In this manner, the removable sled assembly is not provided under the main weight-bearing area of a portable shelter (such as directly beneath the main body of the portable shelter), but rather is provided along the trailing edge of the frame. In some aspects, the removable sled assembly is provided only along the trailing edge of the portable shelter frame. In some aspects, the removable sled assembly is not provided along the leading edge 96 of the portable shelter frame, and/or along the sides of a portable shelter frame. In some aspects, the removable sled assembly is provided at a position that is not under wheels of the portable shelter. In various implementations, the removable sled assembly does not bear the full weight of the portable shelter, by virtue of is position along the trailing edge of the portable shelter frame.

The present disclosure is not to be limited in terms of the particular implementations described in this application, which are intended as illustrations of various aspects. Moreover, the various disclosed implementations can be interchangeably used with each other, unless otherwise noted. Many modifications and variations can be made without departing from its spirit and scope, as will be apparent to those skilled in the art. Functionally equivalent methods and apparatuses within the scope of the disclosure, in addition to those enumerated herein will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular implementations only and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

What is claimed is:

1. A removable sled assembly for a portable shelter having a frame, the sled assembly comprising:
   a runner having an upper surface, a front portion, a rear portion, a main body, a longitudinal axis, and a width; and
   an attachment member comprising
      a support member extending upwardly from the upper surface of the runner,
      a bracket configured to removably engage the frame of the portable shelter,
      wherein the bracket is coupled with the support member via a hinge that defines a pivot axis and allows the bracket to rotate relative to the runner about the pivot axis.

2. The removable sled assembly of claim 1 wherein the bracket has a longitudinal axis that is perpendicular to the longitudinal axis of the runner.

3. The removable sled assembly of claim 1 wherein the bracket further comprises surface treatment on an interior surface.

4. The removable sled assembly of claim 3 wherein the surface treatment comprises one or more pads, cushions, or strips of non-slip or cushioned material.

5. The removable sled assembly of claim 1 wherein the bracket is adjustable to form a fit around the frame of the portable shelter.

6. The removable sled assembly of claim 5 wherein the bracket comprises vertical sides, and at least one of the vertical sides is movable to adjustably fit around the frame of the portable shelter.

7. The removable sled assembly of claim 1 wherein the hinge comprises a loose-pin hinge.

8. The removable sled assembly of claim 1 wherein the hinge comprises a unidirectional hinge.

9. The removable sled assembly of claim 1 wherein the loose-pin hinge comprises a removable pin having a terminal bent portion.

10. The removable sled assembly of claim 9 wherein the removable pin comprises a hole for engaging a fastener.

11. The removable sled assembly of claim 10 wherein the fastener is a cotter pin.

12. The removable sled assembly of claim 1 wherein the front portion of the runner extends from the main body at an upward angle with respect to horizontal to provide a front portion height.

13. The removable sled assembly of claim 12 wherein the front portion of the runner is tapered.

14. The removable sled assembly of claim 13 wherein the rear portion of the runner extends from the main body at an upward angle with respect to horizontal to provide a rear portion height.

15. The removable sled assembly of claim 14 wherein the rear portion height is less than the front portion height.

16. The removable sled assembly of claim 1 comprising two support members.

17. The removable sled assembly of claim 16 further comprising gussets attached to the support members.

18. The removable sled assembly of claim 1 wherein the sled assembly is constructed of aluminum.

19. The removable sled assembly of claim 1 wherein the bracket is configured to engage the portable shelter frame at a trailing edge of the portable shelter.

20. The removable sled assembly of claim 1 wherein the bracket has a length that is greater than the width of the runner.

* * * * *